United States Patent
Zhou et al.

(10) Patent No.: US 9,848,437 B1
(45) Date of Patent: Dec. 19, 2017

(54) MANAGEMENT OF UPLINK CONTROL SIGNALING IN WIRELESS ADJACENT COVERAGE AREAS

(71) Applicant: Sprint Spectrum L.P., Overland Park, KS (US)

(72) Inventors: Yu Zhou, Herndon, VA (US); Luca Zappaterra, Arlington, VA (US); Muhammad Ahsan Naim, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 238 days.

(21) Appl. No.: 14/832,110

(22) Filed: Aug. 21, 2015

(51) Int. Cl.
  *H04W 72/04* (2009.01)
  *H04W 72/08* (2009.01)
  *H04W 72/12* (2009.01)

(52) U.S. Cl.
  CPC ... *H04W 72/1284* (2013.01); *H04W 72/1226* (2013.01)

(58) Field of Classification Search
  None
  See application file for complete search history.

(56) References Cited

U.S. PATENT DOCUMENTS

| | | | | |
|---|---|---|---|---|
| 9,699,803 | B2* | 7/2017 | Finne | H04W 72/1278 |
| 2010/0159972 | A1* | 6/2010 | Cho | H04B 7/022 |
| | | | | 455/501 |
| 2010/0232318 | A1* | 9/2010 | Sarkar | H04W 28/18 |
| | | | | 370/254 |
| 2011/0207494 | A1* | 8/2011 | Zhu | H04B 7/024 |
| | | | | 455/509 |
| 2011/0223929 | A1* | 9/2011 | Boudreau | H04W 72/1231 |
| | | | | 455/452.1 |
| 2013/0114517 | A1* | 5/2013 | Blankenship | H04L 5/0053 |
| | | | | 370/329 |
| 2013/0308473 | A1* | 11/2013 | Sun | H04W 36/30 |
| | | | | 370/252 |

* cited by examiner

*Primary Examiner* — Candal Elpenord

(57) ABSTRACT

A method and system for managing uplink control channel communication by adjacent base stations. Adjacent base stations may programmatically work with each other to arrange for their respective use of different sub-carriers for scheduling their respective uplink control channel communications. Further, to help make more efficient use of all available sub-carriers, a given base station may schedule uplink traffic channel communication for one or more user equipment devices on the same sub-carriers that a neighboring base station is using for uplink control channel communication if those one or more user equipment devices do not report detecting the neighboring base station above a threshold level.

20 Claims, 9 Drawing Sheets

MANAGEMENT OF UPLINK CONTROL SIGNALING IN WIRELESS ADJACENT COVERAGE AREAS

BACKGROUND

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user). In general, each coverage area may operate on one or more carriers each spanning a respective frequency bandwidth, and each coverage area may define an air interface providing a downlink for carrying communications from the base station to UEs and an uplink for carrying communications from UEs to the base station. The downlink and uplink may operate on separate carriers or may be time division multiplexed over the same carrier(s). Further, the air interface may define various channels for carrying communications between the base station and UEs. For instance, the air interface may define one or more downlink traffic channels and downlink control channels, and one or more uplink traffic channels and uplink control channels.

In accordance with the Long Term Evolution (LTE) standard of the Universal Mobile Telecommunications System (UMTS), for instance, each coverage area of a base station may operate on one or more carrier bands (or just "carriers") each spanning 1.4 MHz, 3 MHz, 5 MHz, 10 MHz, 15 MHz, or 20 MHz. On each such carrier used for downlink communications, the air interface then defines a Physical Downlink Shared Channel (PDSCH) as a primary channel for carrying data from the base station to UEs, and a Physical Downlink Control Channel (PDCCH) for carrying control signaling from the base station to UEs. Further, on each such carrier used for uplink communications, the air interface defines a Physical Uplink Shared Channel (PUSCH) as a primary channel for carrying data from UEs to the base station, and a Physical Uplink Control Channel (PUCCH) for carrying control signaling from UEs to the base station.

In LTE, downlink and uplink air interface resources are mapped in the time domain and in the frequency domain. In the time domain, LTE defines a continuum of 10-millisecond (ms) frames, divided into 1-ms subframes, each made up of two 0.5-ms slots. With this arrangement, each subframe is considered to be a transmission time interval (TTI). Thus, each frame has 10 TTIs, and each TTI has 2 slots. In the frequency domain, resources are divided into groups of 12 sub-carriers. Each sub-carrier is 15 kHz wide, so each group of 12 sub-carriers occupies a 180 kHz bandwidth. The 12 sub-carriers in a group are modulated together, using orthogonal frequency division multiplexing (OFDM), in one OFDM symbol.

LTE further defines a particular grouping of time-domain and frequency-domain resources as a resource block. In the time domain, each resource block has a duration corresponding to one slot (0.5 ms). In the frequency domain, each resource block consists of a group of 12 sub-carriers that are used together to form OFDM symbols. Typically, the 0.5 ms duration of a resource block accommodates 7 OFDM symbols, each spanning 66.7 microseconds, with a 4.69 microsecond guard band (cyclic prefix) added to help avoid inter-symbol interference. Depending on the bandwidth of the carrier, the air interface may support transmission on a number of such resource blocks in the two slots of each TTI. For instance, a 5 MHz carrier supports 25 resource blocks in each slot of each TTI, whereas a 20 MHz carrier supports 100 resource blocks in slot of each TTI.

The smallest unit of resources is the resource element. Each resource element corresponds to one sub-carrier and one OFDM symbol. Thus, a resource block that consists of 12 sub-carriers and 7 OFDM symbols has 84 resource elements. Further, each OFDM symbol and thus each resource element can represent a number of bits, with the number of bits depending on how the data is modulated. For instance, with Quadrature Phase Shift Keying (QPSK) modulation, each modulation symbol may represent 2 bits; with 16 Quadrature Amplitude Modulation (16QAM), each modulation symbol may represent 4 bits; and with 64QAM, each modulation symbol may represent 6 bits.

In some contexts, the two-slot-wide resource blocks of each subframe—and thus each TTI—are considered together as a unit in alternate definition of a resource block. This may be appropriate, for example, when resources are allocated in time in terms of subframes scheduled in TTIs, or when specifying operations and/or configurations that align on TTI boundaries. For example, as described below, downlink control channels are typically configured in first few (typically two) OFDM symbol times of every TTI across all carriers of a carrier band. In the alternate definition, each resource block consists of 12 sub-carriers and 14 OFDM symbols for a total of 168 resource elements.

Within a downlink resource block, and cooperatively across all of the resource blocks of the carrier bandwidth, different resource elements can have different functions. In particular, a certain number of the resource elements (e.g., 8 resource elements distributed throughout the resource block) may be reserved for reference signals used for channel estimation. In addition (and as mentioned above), a certain number of the resource elements (e.g., resource elements in the first one, two, or three OFDM symbols of a subframe-wide resource block) may be reserved for the PDCCH and other control channels (e.g., a physical hybrid automatic repeat request channel (PHICH)), and most of the remaining resource elements (e.g., most of the resource elements in the remaining OFDM symbols) would be left to define the PDSCH.

Across the carrier bandwidth, each TTI of the LTE downlink air interface thus defines a control channel space that generally occupies a certain number of 66.7 microsecond symbol time segments (e.g., the first one, two, or three such symbol time segments), and a PDSCH space that generally occupies the remaining symbol time segments, with certain exceptions for particular resource elements. With this arrangement, in the frequency domain, the control channel space and PDSCH space both span the entire carrier bandwidth. In practice, the control channel space is then treated as being a bandwidth-wide space for carrying control signaling to UEs. Whereas, the PDSCH space is treated as defining discrete 12-subcarrier-wide PDSCH segments corresponding to the sequence of resource block across the carrier bandwidth.

One of the main functions of the PDCCH in LTE is to carry "Downlink Control Information" (DCI) messages to served UEs. LTE defines various types or "formats" of DCI messages, to be used for different purposes, such as to indicate how a UE should receive data in the PDSCH of the current TTI, or how the UE should transmit data on the PUSCH in an upcoming TTI. For instance, a DCI message in a particular TTI may schedule downlink communication of bearer data to a particular UE (i.e., a UE-specific data transmission), by specifying one or more particular PDSCH segments that carry the bearer data in the current TTI, what modulation scheme is used for that downlink transmission, and so forth. And as another example, a DCI message in a particular TTI may indicate the presence of one or more paging messages carried in particular PDSCH segments and may cause certain UEs to read the PDSCH in search of any relevant paging messages.

Each DCI message may span a particular set of TTI-wide resource elements on the PDCCH (e.g., one, two, four, or eight control channel elements (CCEs), each including 36 resource elements) and may include a cyclic redundancy check (CRC) that is masked (scrambled) with an identifier (e.g., a particular radio network temporary identifier (RNTI)). In practice, a UE may monitor the PDCCH in each TTI in search of a DCI message having one or more particular RNTIs. And if the UE finds such a DCI message, the UE may then read that DCI message and proceed as indicated. For instance, if the DCI message schedules downlink communication of bearer data to the UE in particular PDSCH segments of the current TTI, the UE may then read the indicated PDSCH segment(s) of the current TTI to receive that bearer data.

In contrast to the downlink control channel, the LTE uplink control channel (PUCCH) is configured on a select subset of sub-carriers of the carrier band, but across a continuum of TTIs. Typically, the sub-carriers of the PUCCH are allocated like-sized groupings of resource blocks at or near the lower-frequency and upper-frequency band edges of the carrier band. For example, the PUCCH can be configured to occupy the first 12 sub-carriers and the last 12 sub-carriers of the carrier band; this configuration would correspond to two "time-strips" of resource blocks, one strip at each of the lower-frequency and upper-frequency band edges of the carrier band. As another example, the PUCCH can be configured to occupy the first 24 sub-carriers and the last 24 sub-carriers of the carrier band; this configuration would correspond to four "time-strips" of resource blocks, two strips at each of the lower-frequency and upper-frequency band edges of the carrier band.

The PUCCH is allocated in units of resource blocks on a per-UE basis, the number of resource blocks per allocation depending, for example, on how much uplink control channel data each UE needs to transmit. Uplink control channel data from a given UE are transmitted independently of uplink traffic data that the given UE may also need to transmit, and can include such control signaling as HARQ, ACK/NACK, channel quality indicators (QCI), and scheduling requests for uplink traffic transmission, among others.

OVERVIEW

In a wireless communication system (such as but not limited to an LTE system) in which multiple base stations provide respective coverage areas in which they schedule uplink wireless communications from UEs on selected sub-carriers of a continuum of sub-carriers of a common carrier band during selected time subframes of a common continuum of time subframes, all of the base stations may be arranged by default to provide their control channels (e.g., PUCCH) in same sub-carriers, and to then use the remaining sub-carriers for the shared channel (e.g., PUSCH). For instance, in LTE as noted above, each base station may configure uplink control channel space in the first and last one or two time-strips of resource blocks at each edge of the common carrier band, leaving the remaining resource blocks largely for use to define the PUSCH.

A problem that can arise with this default arrangement, however, is that uplink control channel communication from UEs served in one such coverage area could interfere with uplink control channel communication from UEs served in an overlapping coverage area. This problem could arise when the UEs served in the respective coverage areas are in or near the overlapping coverage area, for example, so that UEs served by different base stations happen to be in close proximity to one another. In such a scenario, if the respective base stations schedule respective uplink control channel communications for at least some of their respectively served UEs during the same TTIs, the resulting uplink control channel transmissions from the UEs can interfere with each other.

Unfortunately, such control channel interference can produce load issues with respect to both the control channel and the shared traffic channel. For instance, the interference between control channel communications could result in serving base stations failing to receive control signaling from its served UEs, which could necessitate retransmission of the control signaling and thus lead to an increase in control channel load. Further, to the extent control signaling from particular UEs carries scheduling requests for uplink data transmission, failure of the serving base station to receive that control signaling could also mean delayed or failed scheduling of uplink traffic data, which could in turn lead to inefficient uplink traffic channel scheduling and resultant increase in traffic channel load. These issues can in turn result in reduced throughput and/or other types of service degradation. Consequently, an improvement is desired.

Disclosed herein is a method and system to help overcome this problem. In accordance with the disclosure, adjacent base stations may programmatically work with each other to arrange for their respective use of different sub-carriers for scheduling their respective uplink control channel communications. Further, to help make more efficient use of all available sub-carriers, a given base station may schedule uplink traffic channel communication for one or more UEs on the same sub-carriers that a neighboring base station is using for uplink control channel communication if those one or more UEs (i) do not report detecting the neighboring base station above a threshold level, and (ii) are determined by the given base station to be operating under favorable uplink channel conditions (as measured, for example, by signal-to-noise ratio (SNR) or the like).

This concurrent use of the same sub-carriers for traffic channel communication for UEs served by the given base station and for control channel communication for UEs served by the neighboring base station can be possible if the UEs served by the different base stations are far enough away from one another that their respective uplink transmissions do not interfere. Particular UEs served by the given base station that do not report detecting the neighboring base station above a threshold level may be deemed as far from any overlapping coverage area, and thus far from potentially interfering UEs in or near the overlapping coverage are and served by the neighboring base station. Further, if these particular UEs (or at least one or a few of them) served by the given base station are also experiencing high SNR on their respective uplinks, then their uplink transmissions may be even less likely to interfere with UEs served by the neighboring base station. Determination of favorable uplink conditions of the particular UEs (or other UEs, in general) can be made, for example, by comparing some form of each particular UE's SNR as measured by the given base station (and as further described below) with a threshold SNR level.

Accordingly, in one respect, disclosed is a method operable in a wireless communication system in which base stations provide respective coverage areas in which to serve user equipment devices (UEs), wherein the base stations schedule uplink wireless communications from UEs in their respective coverage areas on selected sub-carriers of a continuum of sub-carriers of a common carrier band during time segments of selected time subframes of a common continuum of time subframes. According to the method, in response to a first base station determining that one or more adjacent second base stations are scheduling uplink control channel communication from UEs in their respective coverage areas on particular ones of the sub-carriers of the common carrier band, the first base station will schedule uplink control channel communication from UEs in its respective coverage area on one or more different ones of the sub-carriers of the common carrier band, other than the particular ones of the sub-carriers; and the first base station will schedule uplink traffic channel communication on one or more of the particular ones of the sub-carriers of the common carrier band for one or more particular UEs being served by the first base station that both (i) do not report detecting the one or more adjacent second base stations above a threshold level, and (ii) are operating with respective uplink quality levels above a quality threshold.

In another respect, disclosed is a first base station in a wireless communication system in which base stations provide respective coverage areas in which to serve user equipment devices (UEs), wherein the base stations schedule uplink wireless communications from UEs in their respective coverage areas on selected sub-carriers of a continuum of sub-carriers of a common carrier band during time segments of selected time subframes of a common continuum of time subframes. The first base station comprises one or more processors; memory accessible to the one or more processors; and machine-readable instructions stored in the memory that, upon execution by the one or more processors, cause the first base station to carry out operations including: in response to determining that one or more adjacent second base stations are scheduling uplink control channel communication from UEs in their respective coverage areas on particular ones of the sub-carriers of the common carrier band, scheduling uplink control channel communication from UEs in its respective coverage area on one or more different ones of the sub-carriers of the common carrier band, other than the particular ones of the sub-carriers; and scheduling uplink traffic channel communication on one or more of the particular ones of the sub-carriers of the common carrier band for one or more particular UEs being served by the first base station that both (i) do not report detecting the one or more adjacent second base stations above a threshold level, and (ii) are operating with respective uplink quality levels above a quality threshold.

In still another respect, disclosed is a wireless communication comprising: a first base station configured to serve user equipment devices (UEs) in a first coverage area and to schedule uplink wireless communications from UEs in the first coverage area on selected sub-carriers of a continuum of sub-carriers of a common carrier band during time segments of selected time subframes of a common continuum of time subframes; and a second base station configured to serve UEs in a second coverage area and to schedule uplink wireless communications from UEs in the second coverage area on selected sub-carriers of the continuum of sub-carriers of the common carrier band during time segments of selected time subframes of the common continuum of time subframes, wherein the first coverage area at least partially overlaps with the second coverage area, and wherein the first base station is further configured to: make a determination that the second base station is scheduling uplink control channel communication from UEs in the second coverage areas on particular ones of the sub-carriers of the common carrier band; in response to making the determination, schedule uplink control channel communication from UEs in the first coverage area on one or more different ones of the sub-carriers of the common carrier band, other than the particular ones of the sub-carriers; and schedule uplink traffic channel communication on one or more of the particular ones of the sub-carriers of the common carrier band for one or more particular UEs being served by the first base station that both (i) do not report detecting the one or more adjacent second base stations above a threshold level, and (ii) are operating with respective uplink quality levels above a quality threshold.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
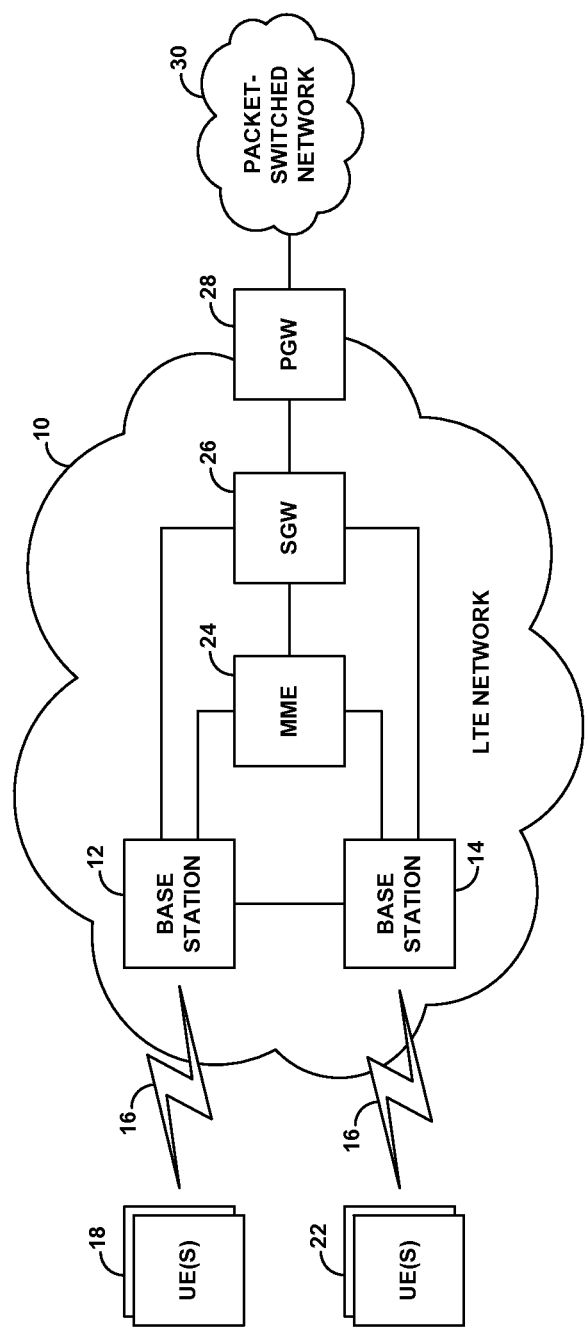
FIG. 1 is a simplified block diagram of an example wireless communication system in which example embodiments of the present disclosure can be implemented.

Referring to the drawings, as noted above, FIG. 1 is a simplified block diagram of an example wireless communication system in which features of the present disclosure can be implemented. In particular, FIG. 1 depicts a representative LTE network 10, which functions primarily to serve UEs with wireless packet data communication service, including possibly voice-over-packet service, but may also provide other functions. As shown, the LTE network includes two representative LTE base stations (evolved Node-Bs (eNodeBs)) 12, 14, each of which would have an antenna structure and associated equipment for providing a respective LTE coverage area in which to serve UEs. By way of example, eNodeB 12 is shown providing a coverage area 16 in which to serve one or more UEs 18, and eNodeB 14 is shown providing a coverage area 20 in which to serve one or more UEs 22. The UEs may take various forms, such as any of those noted above, whether or not operated by a human "user."

In practice, these base stations may be adjacent to each other in the wireless communication system. This adjacent relationship between the base stations could be defined in various ways. For instance, the base stations could be considered adjacent to each other if the base stations' respective coverage areas overlap with each other in whole or in part, as may be established by one or more UEs served by one of the base stations reporting to the serving base station that the UE(s) are detecting signals from the other base station. Alternatively or additionally, the base stations could be considered adjacent to each other simply if at least one of the base stations lists the other base station on a neighbor list useable to manage handover of UEs between the base stations. Physically, the base stations can be co-located or distributed at some distance from each other.

Further, the base stations themselves can take various forms. By way of example, either or each base station could be a macro base station of the type typically provided by a wireless service provider with a tower mounted antenna structure and associated equipment. Or either or each base station could be a small cell base station (such as a femtocell, picocell, or the like) typically provided to help improve coverage or capacity within macro cell coverage and usually having a much smaller form factor and coverage range than a macro base station. As a specific example, base station 12 could be a macro base station, and base station 14 could be a small cell base station positioned at least partially within coverage of the macro base station. Thus, the two base stations would provide overlapping coverage.

As further shown in the example arrangement of FIG. 1, the base stations have a communication interface (e.g., an LTE "X2" interface) with each other, and each base station has a communication interface with a mobility management entity (MME) 24 that functions as a signaling controller for the LTE network and may also facilitate communication between the base stations. Further, each base station then has a communication interface with a serving gateway (SGW) 26, which in turn has a communication interface with a packet-data network gateway (PGW) 28 that provides connectivity with a packet-switched network 30, and the MME 24 has a communication interface with the SGW 26. In practice, the illustrated components of the LTE network may sit as nodes on a private packet-switched network owned by an operator of the LTE network, and thus the various communication interfaces may be logical interfaces through that network.

Each base station may provide service on at least one particular carrier having a carrier bandwidth (such as 5 MHz or other bandwidth as discussed above), and the adjacent base stations may provide service on the same carrier as each other. As noted above, each base station's coverage area may then define a continuum of subframes in the time domain, with each subframe being divided into a sequence of time segments for communicating modulated data. Further, the base stations may be time synchronized with each other, so that their subframes and time segments within their subframes occur at the same time as each other (possibly with minor tolerance for variation). Thus, each base station's coverage area would start a new subframe at the same time as the other base station's coverage area, and the time segments within a subframe of one base station's coverage area would be aligned in time with the time segments of the other base station's coverage area. This time synchronization could be established by use of GPS timing or another mechanism.

Figure 2A:
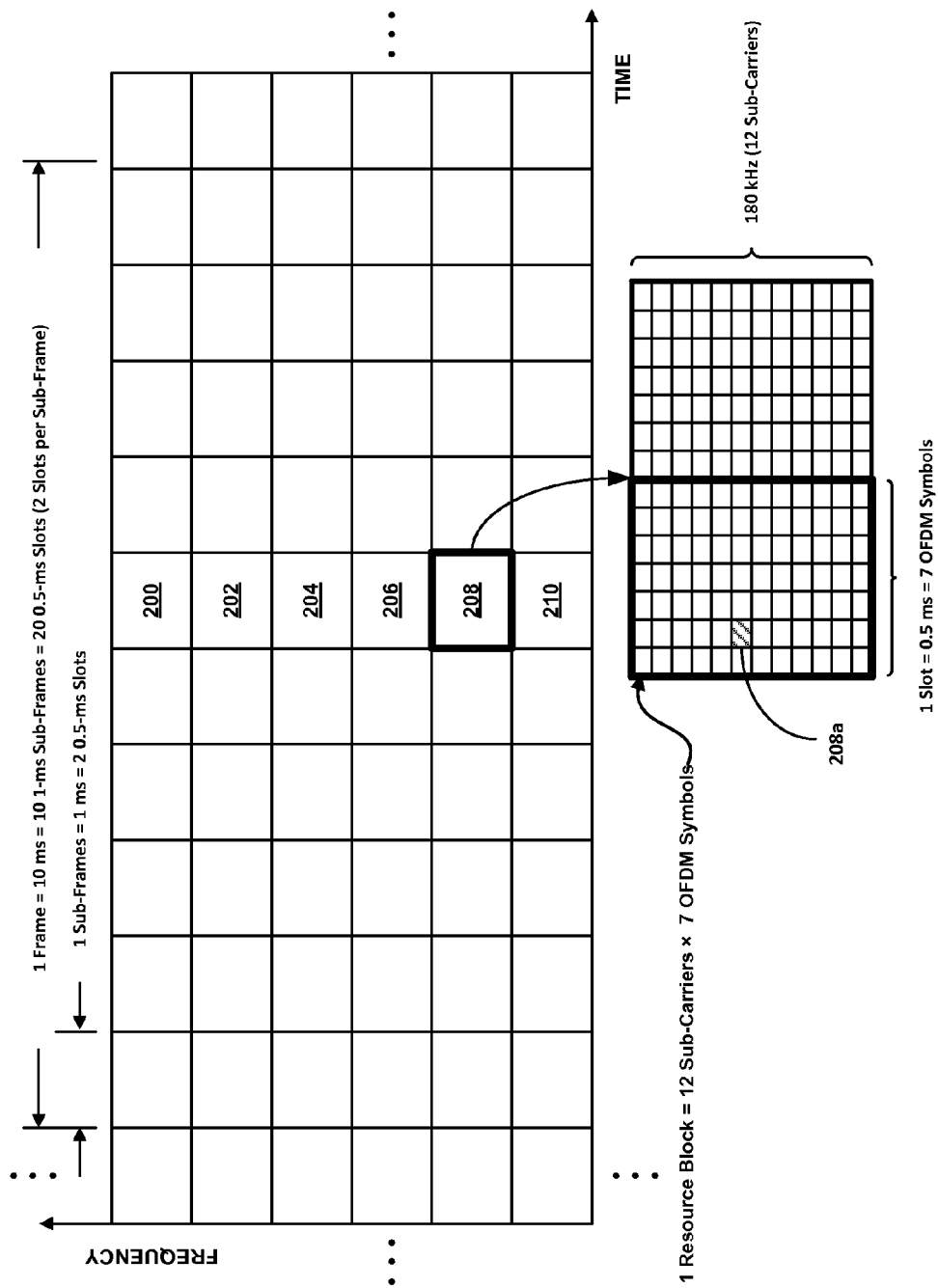
FIG. 2A is a conceptual illustration of a division of a shared channel into resource blocks, in accordance with an example embodiment.

FIG. 2A illustrates how the resources in a given wireless coverage area may be divided in time and frequency domains into resource blocks. In the time domain, each resource block occupies a 0.5 ms slot of a 1 ms subframe or TTI. Every group of 10 consecutive subframes or TTIs makes up one transmission frame.

By way of example, FIG. 2A shows TTI-wide resource blocks 200-210 for a particular TTI. In the frequency domain, each of TTI-wide resource blocks 200-210 occupies a respective portion of frequency bandwidth, typically 180 kHz in LTE implementations. Although FIG. 2A shows just six TTI-wide resource blocks in each subframe, a wireless coverage area could have a greater number of resource blocks, as indicated by the vertical ellipses above and below resource blocks in the figure.

FIG. 2A also includes a more detailed view of the TTI-wide resource block 208. This detailed view shows that the 180 kHz of frequency bandwidth corresponds to 12 sub-carriers of 15 kHz each, and also shows that the 0.5 ms slot corresponds to the duration of 7 OFDM symbols (the number of OFDM symbols in a resource block can vary). The detailed view also depicts the slot 208 as half of one subframe. Thus, this view shows a slot-wide resource block. As noted, the term "resource block" is commonly used for both a slot-wide interpretation and a subframe-wide (or TTI-wide) interpretation. In the remainder of this disclosure, the term "resource block" will be used herein generally without making a distinction between the two interpretations, unless such a distinction is material to the discussion at hand. The distinction will be clear from context, in any case, and is not limiting with respect to example embodiments described herein unless otherwise noted.

Each OFDM symbol in a given resource block spans the 12 sub-carriers and includes a respective sub-carrier symbol on each sub-carrier. Thus, a resource block may be described as a set of resource elements, with each resource element corresponding to a sub-carrier symbol that is carried on a particular sub-carrier for the duration of one OFDM symbol, also referred to herein as a symbol transmission time. The detailed view of the resource block 208 in FIG. 2A shows the division of the resource block into multiple resource elements, such as resource element 208a.

Each sub-carrier symbol or resource element represents a data block of a certain number of bits, depending on the type of modulation that is used. For example, if Quadrature Phase Shift Keying (QPSK) is used for the sub-carrier symbols, then each sub-carrier symbol represents two bits of data. If Quadrature Amplitude Modulation (QAM) is used for the sub-carrier symbols, then each sub-carrier symbol represents a greater number of bits: four bits per symbol for 16QAM and six bits per symbol for 64QAM.

Figure 2B:
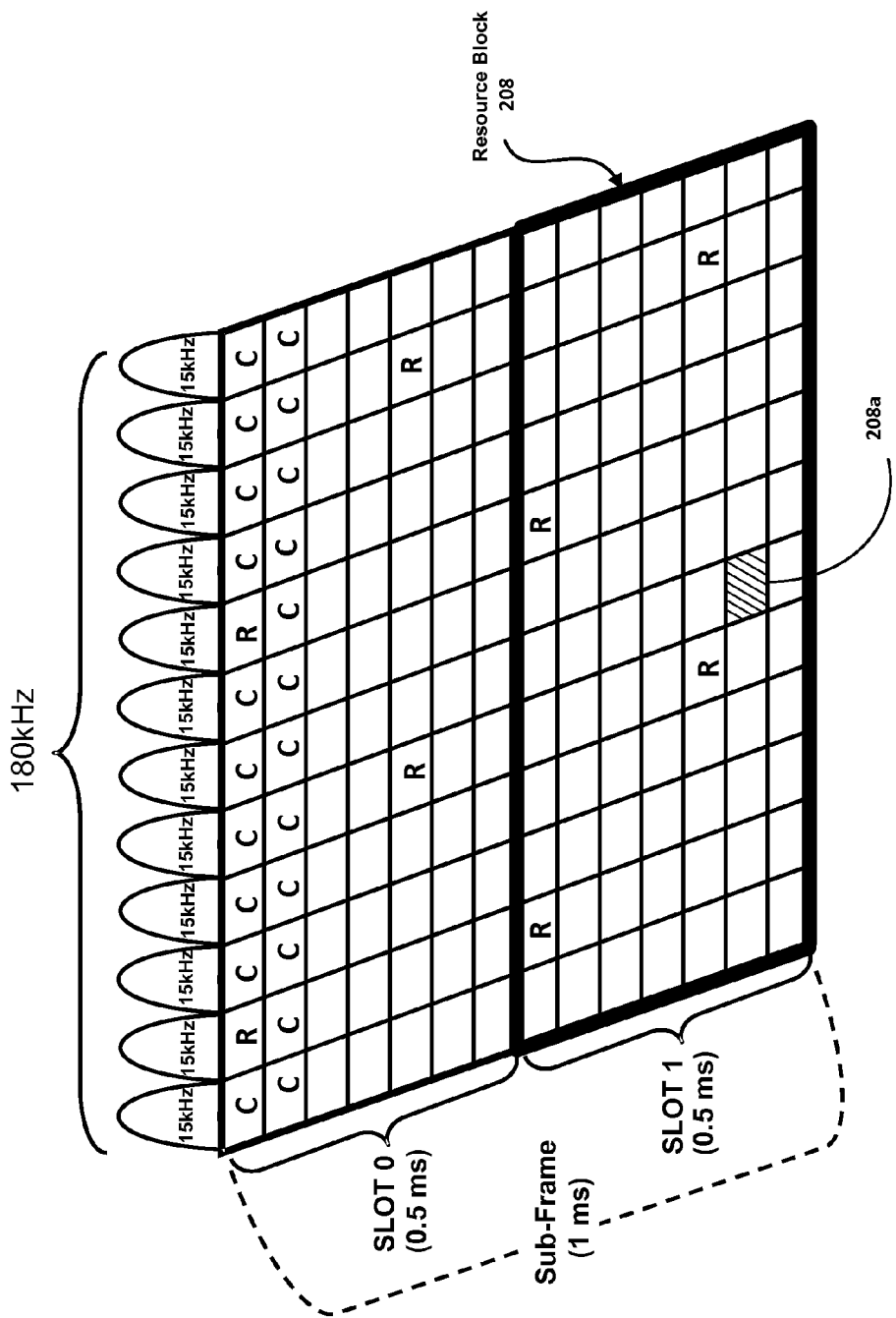
FIG. 2B is a conceptual illustration of a resource block, in accordance with an example embodiment.

Different resource elements in a resource block may be used for different purposes. FIG. 2B illustrates different functions among the 168 resource elements in two example downlink resource blocks of an example subframe for a one-antenna port system. In this example, 8 of the resource elements are labeled "R" to indicate that they are reserved for reference signals used for channel estimation. In addition, for a TTI-wide resource block aligned on TTI boundaries, certain of the first two OFDM symbols on the downlink are used for downlink control channels. This is shown in FIG. 2B, where 22 of the resource elements in the first two OFDM symbols are labeled "C" to indicate that they are used to transmit control signaling (PCFICH, PDCCH, and PHICH channels). The other 138 resource elements that are unlabeled can be used to transmit user data (PDSCH channel). It is to be understood that FIG. 2B illustrates only one possible configuration. In other configurations, a downlink resource block could have a greater or fewer number of resource elements available to transmit user data. In a similar manner, the PUSCH and PUCCH channels of an uplink resource block can be configured among specific resource elements of an one or more uplink resource blocks.

Figure 3:
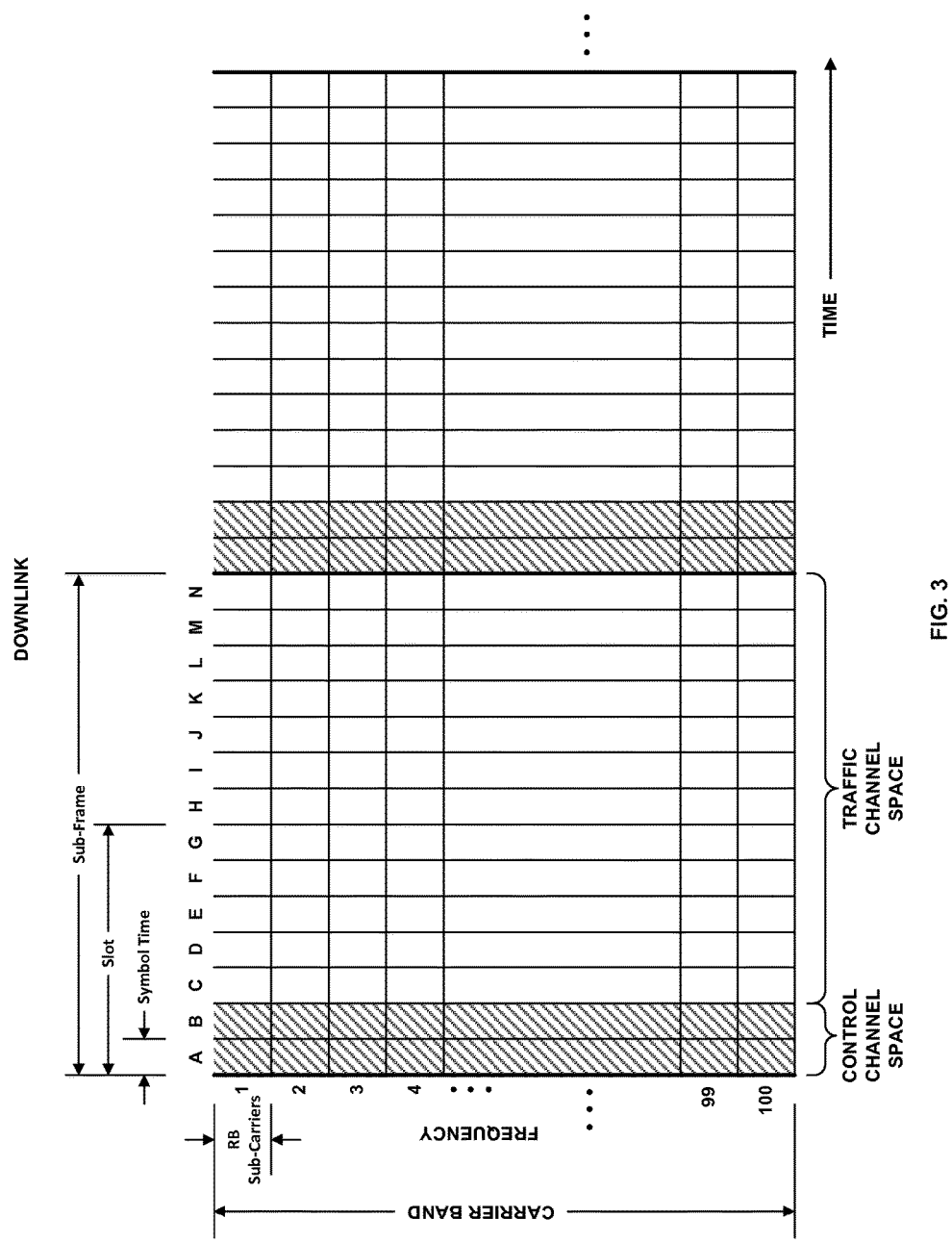
FIG. 3 is an illustration of two consecutive example downlink subframes, depicting an example sequence of time segments within each subframe.

FIG. 3 next depicts an example of two downlink subframes, shown spanning the entire utilized carrier bandwidth for an example carrier band. As illustrated in FIG. 3, each example subframe is divided over time into a sequence of 14 symbol time segments, and divided over frequency into, by way of example, 100 resource-block sequences of sub-carriers (e.g., 12 consecutive sub-carriers per sequence). As noted above, 100 resource blocks corresponds to utilized bandwidth for a 20 MHz carrier band. For brevity in the figure, labels in the time domain are shown only for the first of the subframes. Namely, the 14 symbol time segments are labeled A through N in their order of occurrence; under LTE, each may be 66.7 microseconds or the like. In the frequency domain only resource blocks 1-4 and 99-100 are explicitly demarked and labeled; intervening resource blocks are indicated by vertical ellipses. Resource block #1 is also labeled "RB Sub-Carriers" to signify a sequence of consecutive sub-carriers. As with the subframe timing, although the sequence of these time segments is shown with one time segment right after another and with the sequence of time segments spanning the full duration of the subframe, the sequence could be defined in other ways, such as including just certain time segments within the subframe. In practice, the illustrated sequence of time segments may repeat for each successive subframe of the continuum of subframes, as represented by the second, unlabeled subframe in FIG. 3.

As discussed above, in a typical LTE implementation, the first one, two, or three symbol time segments in each subframe would be used to define downlink control channel space (e.g., for PDCCH and PHICH communication), and the remaining symbol time segments in each subframe would then be used to define downlink shared channel space (e.g., for PDSCH communication), with the understanding that certain resource elements would be reserved for other purposes (such as to carry reference signals for instance). This arrangement is signified in FIG. 3 by cross-hatching in the first two symbol time segments in each of the two subframes shown, and labeled "Control Channel Space" on the first subframe. The remaining symbol time segments are available for user traffic, as also labeled on the first subframe. Note that in the example illustrated in FIG. 3, the control channel (cross-hatched symbol time segments) extends across the entire utilized carrier bandwidth; i.e., across all resource blocks.

Figure 4:
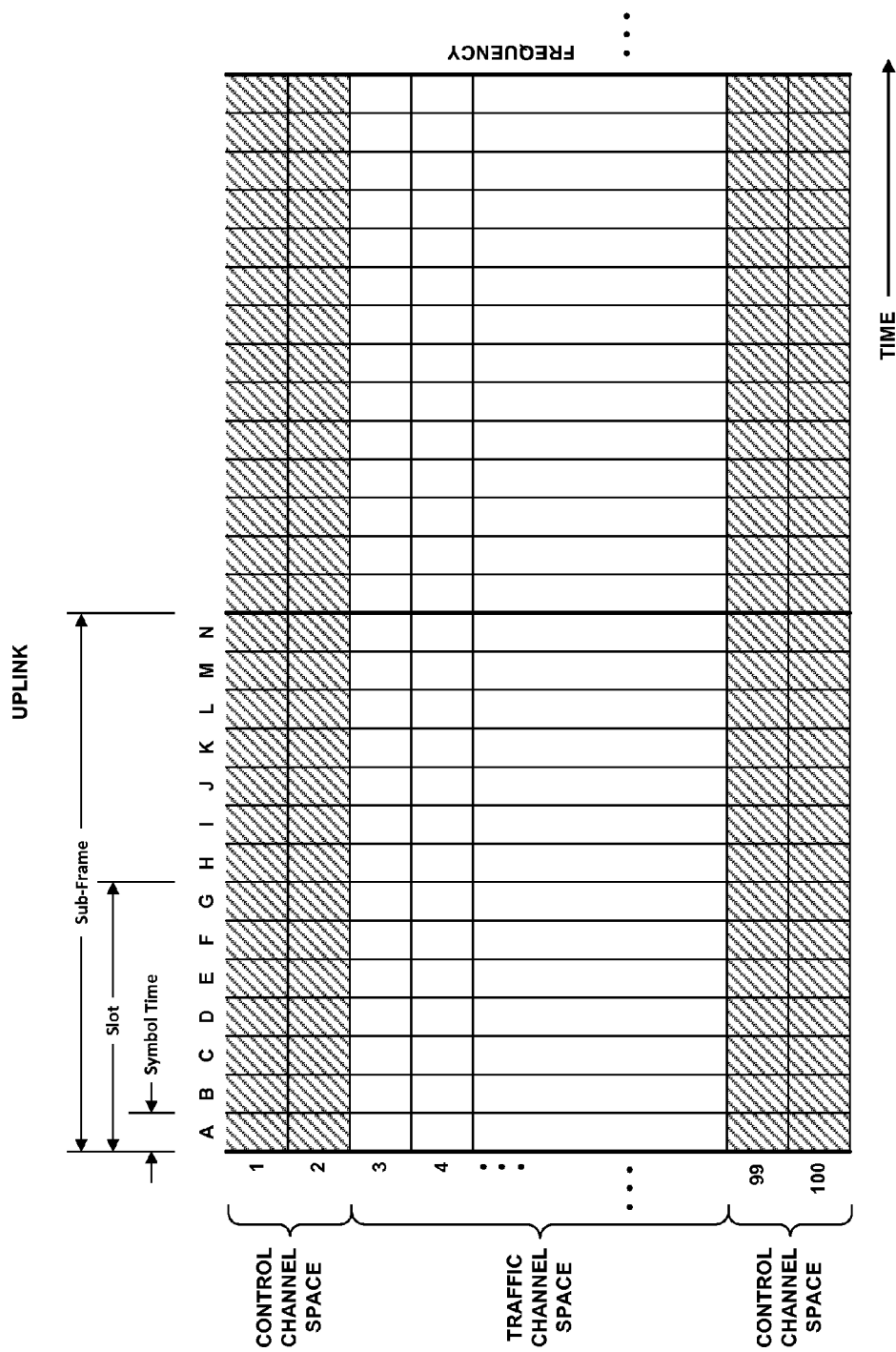
FIG. 4 is an illustration of two consecutive example uplink subframes, depicting an example sequence of time segments within each subframe.

FIG. 4 depicts an example of two uplink subframes, again shown spanning the entire utilized carrier bandwidth for an example carrier band. As with FIG. 3, each example subframe in FIG. 4 is divided over time into a sequence of 14 symbol time segments, and divided over frequency into, by way of example, 100 resource-block sequences of sub-carriers (e.g., 12 consecutive sub-carriers per sequence). Again, labels A through N in the time domain are shown only for the first of the subframes, and only resource blocks 1-4 and 99-100 are explicitly demarked and labeled in the frequency domain.

Also as discussed above, in a typical LTE implementation, sub-carriers at the lower and upper edges of the carrier band are allocated for uplink control channel space (e.g., for PUCCH communication), and the remaining would then be used to define uplink shared channel space (e.g., for PUSCH communication), again with the understanding that certain resource elements would be reserved for other purposes (such as to carry reference signals for instance). The uplink control channels are typically configured in sub-carrier sequences that span resource blocks at the carrier band edges, and span a continuum in the time domain. This arrangement is signified in FIG. 4 by cross-hatching in, by way of example, resource blocks 1-2 and 99-100, and labeled "Control Channel Space." As shown, the frequency allocations span all the time elements (symbol times, slots, and subframes) of both subframes shown in FIG. 4. The remaining symbol time segments are available for user traffic, as also labeled on the first subframe.

Under LTE, a given UE is allocated uplink control channel space in units of resource blocks. Additionally, LTE provides for frequency diversity by allocating uplink control channel space in pairs of resource blocks at opposite edges of the carrier band and in offset slots of a common subframe. By way of example, a given UE might be allocated the first slot (A-G) of resource block #1 and the second slot (H-N) of resource block #100 in FIG. 4 for a particular uplink control channel communication. As a further example, a different UE might be allocated the second slot (H-N) of resource block #2 and the first slot (A-G) of resource block #99 in FIG. 4 for its uplink control channel communication. Other allocation configurations are possible, including larges sizes (four, six, etc., resource blocks) per UE and different lower-upper band-edge pairings.

A UE is allocated one or more pairs of resource blocks for uplink control channel communication (e.g., PUCCH communication) as part of uplink control channel scheduling by the UE's serving base station (e.g., eNodeB). For example, the serving base station may schedule a particular pair of resource blocks in the PUCCH space of a subframe during an upcoming TTI for a UE to use for requested uplink control signaling. The base station will then signal the UE on a downlink control channel (e.g., PDCCH) to inform the UE which upcoming resource blocks to use for the transmitting its uplink control data. In doing so, the base station will allocate the scheduled resource blocks to the UE for the UE's uplink control communication.

Figure 5:
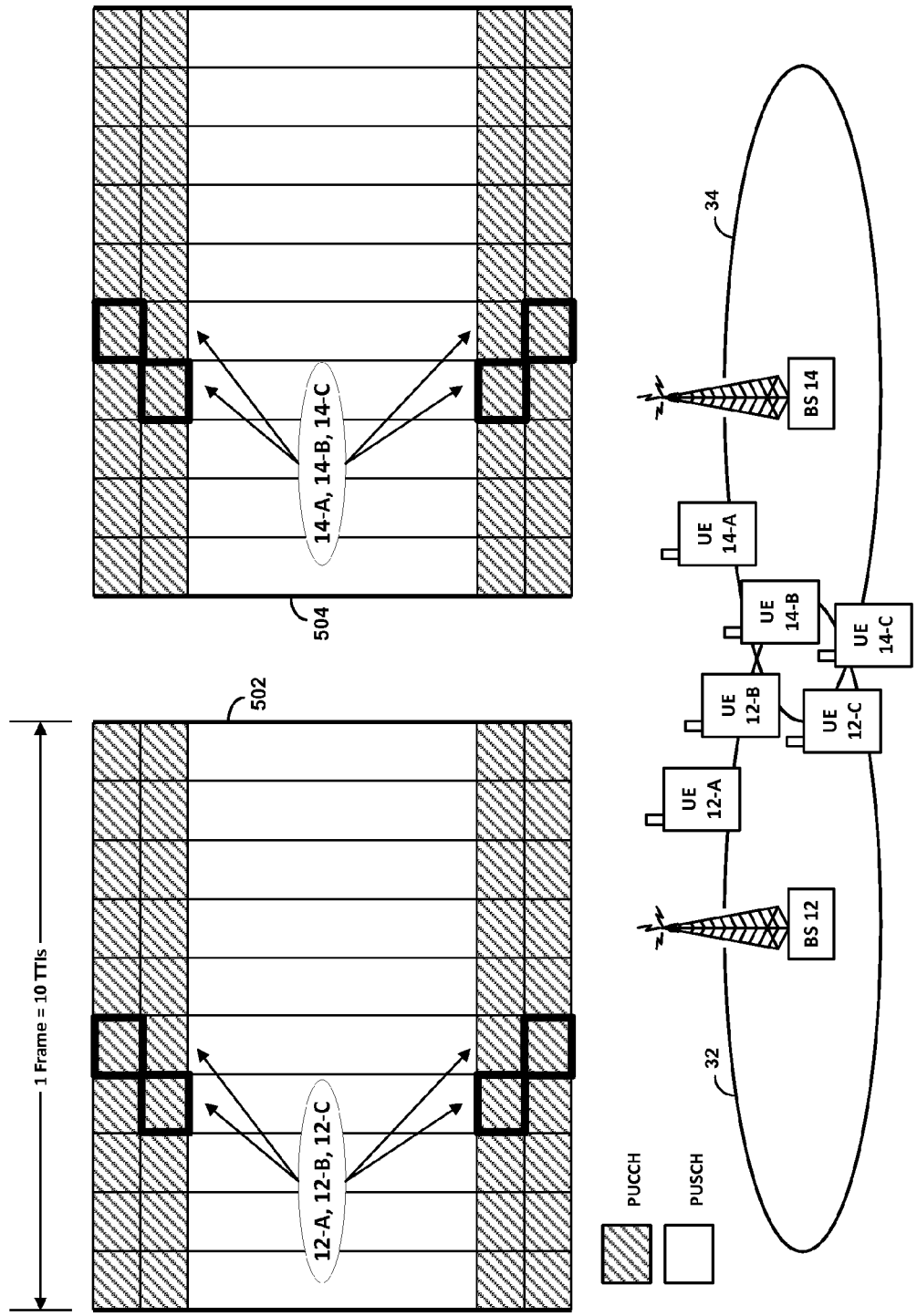
FIG. 5 is an illustration of uplink frames of adjacent base station coverage areas, showing potentially interfering control channel space in the coverage areas.

As further noted above, however, a problem could arise where two adjacent base stations, operating according to convention under LTE, use the same sub-carriers of a common carrier band for scheduling uplink control channel communication from UE respectively served by the two base stations. FIG. 5 depicts such a situation, by way of example. In particular, FIG. 5 shows concurrent frames 502 and 504 of uplink communications (represented at the top of FIG. 5) between base stations 12 and 14 and (at least some of) their respectively served UEs (depicted at the bottom of FIG. 5). In accordance with the description above, each frame includes 10 TTIs. Evidently, and by way of example, each base station schedules uplink control channel communication using sub-carriers of the first two resource blocks and last two resource blocks of the common carrier band. This is indicated by hatch marks across the first two and last two resource blocks of the frame 502 used by BS 12 for PUCCH communication, and similarly by hatch marks across the first two and last two resource blocks of the frame 504 used by BS 14 PUCCH communication. For both frames 502 and 504, the uplink traffic channel space (e.g., PUSCH) is shown in white, but explicit demarcation of resource blocks is omitted for the sake of brevity in the figure.

In the example illustrated in FIG. 5, BS 12 provides a coverage area 32, and BS 14 provides a coverage area 34, and the two coverage areas partially overlap, as indicated by the intersection of the two ovals representing the two coverage areas. As such, BS 12 and BS 14 may be considered adjacent or neighboring base stations. A UE operating in or near the overlapping region may be able to detect both base stations 12 and 14 above a specified threshold. In particular, UEs in the overlapping region might be able to detect both base stations sufficiently strongly to be able to be served by either one.

As further illustrated by way of example, the base station 12 is shown as serving three UEs: UE 12-A, UE 12-B, and UE 12-C. Similarly the base station 14 is shown as serving four UEs: UE 14-A, UE 14-B, and UE 14-C. The problem, noted above, that could arise under conventional operation may occur when one or more UEs served by BS 12 and one or more UEs served by BS 14 are all in or near the region of overlapping coverage. This situation illustrates how UEs served by different base stations can be close enough to each other so that uplink transmissions on the same sub-carriers and during the same TTIs but to different base stations may interfere with one another. When this occurs, one or another or both of the two base stations may receive uplink communications that are contaminated by interference due to uplink transmissions from UEs being served by the other base station.

Thus, adjacent base stations that, according to conventional operation, schedule uplink control channel communications on the same sub-carriers of a common carrier band may be susceptible to interference on their respective uplink control channels when the UEs transmitting to each base station are in or near the overlap region, or otherwise close enough to both base stations to be detected by both. The illustration in FIG. 5 depicts such an interference scenario by way of example.

In the example scenario, the base station 12 has evidently scheduled PUCCH communications from UEs 12-A, 12-B, and 12-C on the second and second-to-last PUCCH resource blocks during the fourth TTI of the frame 502, and on the first and last PUCCH resource blocks during the fifth TTI of the frame 502 (where first, last, and the like refer to the frequency domain defined by the carrier band). Similarly, the base station 14 has evidently scheduled PUCCH communications from UEs 14-A, 14-B, and 14-C on the second and second-to-last PUCCH resource blocks during the fourth TTI of the frame 504, and on the first and last PUCCH resource blocks during the fifth TTI of the frame 504. The scheduled PUCCH resource blocks are indicated by thick black lines demarking their borders. The specific slot assignments of the respective UEs are not shown, but do not, in any case, bear on the present explanation.

For the example scenario illustrated, it is possible that the BS 12 will detect uplink communication not only from the UEs 12-A, 12-B, and 12-C, but will also detect uplink communication from the UEs 14-A, 14-B, and 14-C. Since both sets of UEs will be using the same sub-carries during the same TTIs, the BS 12 may detect both sets at the same time and on the same sub-carriers, resulting in interference. In a similar manner, it is possible that the BS 14 will detect uplink communication not only from the UEs 14-A, 14-B, and 14-C, but will also detect uplink communication from the UEs 12-A, 12-B, and 12-C. Since both sets of UEs will be using the same sub-carries during the same TTIs, the BS 14 may detect both sets at the same time and on the same sub-carriers, resulting in interference. As noted above, such interference can have a detrimental effect service to individual UEs, and/or more generally result in overall degradation of system performance or throughput.

To help overcome this problem, the present disclosure provides for the base stations to work with each other (e.g., to engage in inter-base station signaling with each other) so as to arrange for their use of different sub-carriers than each other for scheduling their respective uplink control channel communication, and for each base station to not schedule uplink control channel communication on sub-carriers that the other base station will be using for scheduling uplink control channel communication. Further, to help mitigate possible reduction in the availability of uplink traffic channel bandwidth that may otherwise result from the above arrangement of different sub-carriers per base station for uplink control communications, each base station may schedule uplink traffic channel communication using sub-carriers that the other base station is using for uplink control channel communication if the uplink traffic channel communication scheduling is done for one or more UEs that don't detect the other base station above a threshold level, and that further are measured by their serving base station to have signal-to-noise ratios (or some similar uplink quality measure) above a threshold signal-to-noise ratio.

In practice, for instance, base station 12 may select one or more particular sets of sub-carriers for scheduling uplink control channel communication and may transmit a signal to base station 14, notifying base station 14 that base station 12 will be using the one or more particular sets of sub-carriers for scheduling uplink control channel communication. Notification may involve inter-base station communication over an X2 connection, for example. Further, the base station 14 may select one or more other sets of sub-carriers for scheduling uplink control channel communication, perhaps in response to the signal from base station 12, and may transmit a signal to base station 12 notifying base station 12 that base station 14 will be using the one or more other sets of sub-carriers for scheduling uplink control channel communication. Once more, notification may involve inter-base station communication over an X2 connection. Alternatively, this arrangement process could have one of the base stations managing the allocation of sub-carriers between the base stations for each to use for scheduling uplink control channel communications, such as directing the other base station which sub-carriers to use, and/or could involve input or directives from one or more other entities, such as MME 24 for instance.

With the agreement in place for one base station to use one or more sets of sub-carriers for scheduling uplink control channel communication and for an adjacent other base station to use a different (mutually exclusive) one or more sets of sub-carriers for scheduling uplink control channel communication, each base station may then engage in scheduling and receiving uplink control channel communication accordingly, and without interference. In particular, each base station may schedule and receive uplink control channel communication in the one or more sets of sub-carrier that it has selected (or been assigned, for example) and not schedule uplink control channel communication in sub-carriers that the adjacent base station has selected (or been assigned) to use for scheduling uplink control channel communication. Further, each base station may also generally, with an exception described below, abstain from scheduling uplink traffic channel communication in sub-carriers that the adjacent base station is set to use for scheduling uplink control channel communication.

Figure 6:
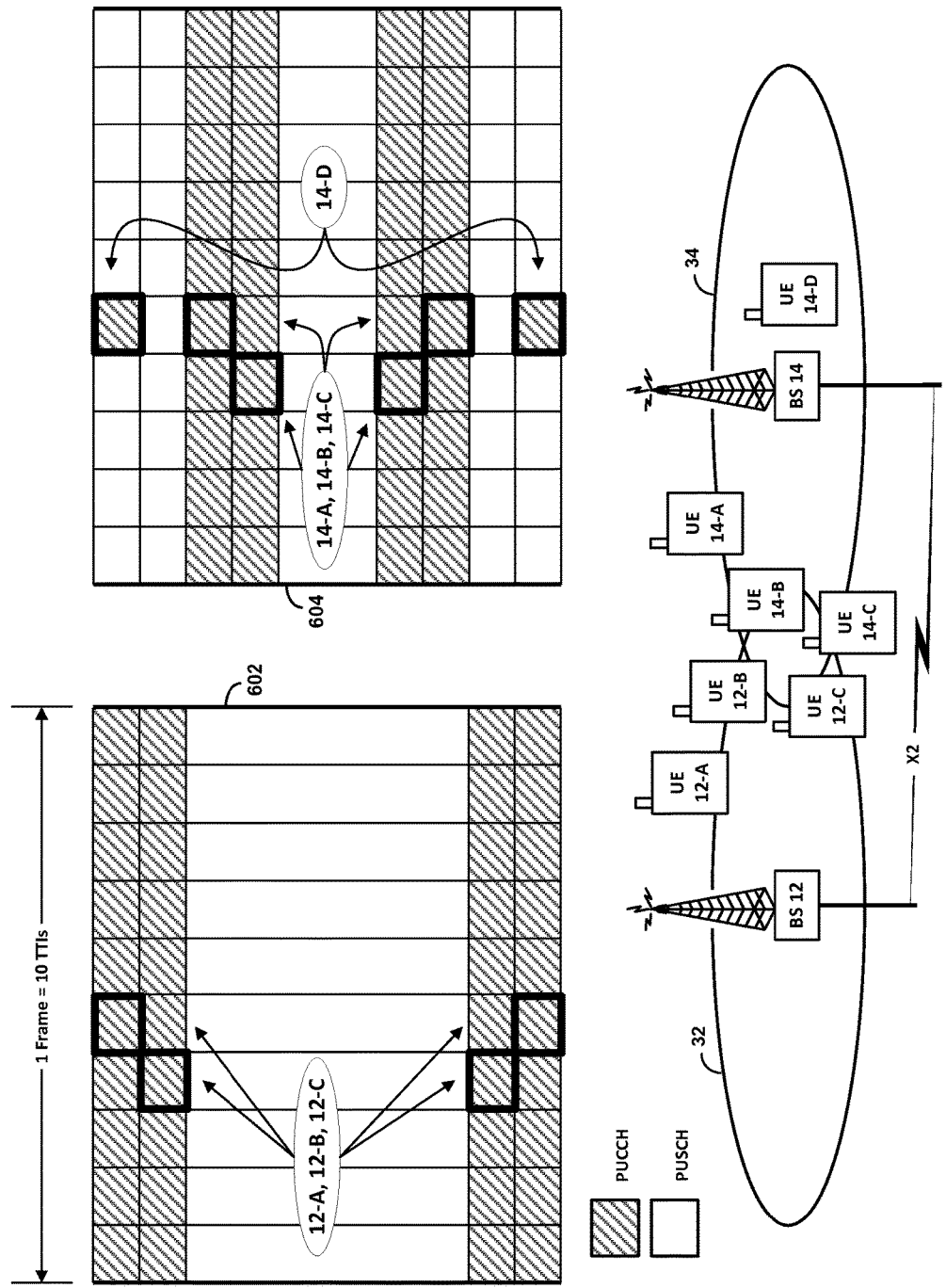
FIG. 6 is an illustration of uplink frames of adjacent base station coverage areas but with the coverage areas using different sub-carriers than each other for control channel space, and concurrently sharing sub-carriers for non-interfering UEs, in accordance with example embodiments.

This technique for managing and scheduling uplink control channel communication so as to avoid the disadvantages of conventional management and scheduling is illustrated by way of example in FIG. 6. In a manner similar to FIG. 5, FIG. 6 shows concurrent frames 602 and 604 (represented at the top of FIG. 6) of uplink communications between base stations 12 and 14 (at least some of) their respectively served UEs (depicted at the bottom of FIG. 6). The description of FIG. 5 applies generally to FIG. 6 as well, except that base station 14 is depicted as serving an additional UE, namely UE 14-D. And, more significantly, in the illustration of FIG. 6, the two base stations now use different sub-carriers for scheduling their respective uplink control channel communications. FIG. 6 further depicts an X2 connection between base stations 12 and 14 that may be use, among other purposes, for inter-base station communication to coordinate selection of mutually exclusive sub-carriers for respective scheduling by each base station of uplink control channel communication.

Specifically, but by way of example, base station 12 schedules uplink control channel communication using sub-carriers of the first two resource blocks and last two resource blocks of the common carrier band. This is again indicated by hatch marks across the first two and last two resource blocks of the frame 602 used by BS 12 for PUCCH communication. Further, as specified by inter-base station agreement or by some other means of selection or assignment, base station 14 schedules uplink control channel communication using sub-carriers of the third and fourth resource blocks and fourth-to-last and third-to-last resource blocks of the common carrier band. This is indicated by hatch marks across the third and fourth resource blocks and fourth-to-last and third-to-last resource blocks of the frame 604 used by BS 14 for PUCCH communication.

With this arrangement, the two base stations can schedule uplink control channel communications during the same TTIs without causing any interference. In the current illustrative example of FIG. 6, the base station 12 has evidently scheduled PUCCH communications from UEs 12-A, 12-B, and 12-C on the second and second-to-last PUCCH resource blocks during the fourth TTI of the frame 602, and on the first and last PUCCH resource blocks during the fifth TTI of the frame 602 (where again first, last, and the like refer to the frequency domain defined by the carrier band). On the other hand, the base station 14 has evidently scheduled PUCCH communications from UEs 14-A, 14-B, and 14-C on the fourth and fourth-to-last PUCCH resource blocks during the fourth TTI of the frame 604, and on the third and third-to-last last PUCCH resource blocks during the fifth TTI of the frame 604. The scheduled PUCCH resource blocks are again indicated by thick black lines demarking their borders. Since the uplink control channel communications to the two base stations are now scheduled and transmitted on different sub-carriers by the two base stations' respectively served UEs, the transmissions do not interfere with one another.

In further accordance with example embodiments, a base station can determine which (if any) of its served UEs could transmit uplink traffic communications on sub-carriers that the adjacent base station is using for scheduling uplink control channel communication, but without the uplink traffic communications causing interference (or intolerable interference) on those sub-carriers for the adjacent base station. For such UEs, the serving base station can then schedule uplink traffic channel communications using sub-carriers that the adjacent base station is using for scheduling uplink control channel communication.

More particularly, the determination that a given UE being served by a base station, such BS 14, is not detecting an adjacent or neighboring base station, such as BS 12, above a threshold level may be taken as an indication that the given UE is sufficiently far from the adjacent base station so as not to be in or near an area of overlapping coverage of the given UE's serving base station and the adjacent base station. As such, the given UE may also not be in the likely vicinity of UEs served by the adjacent base station. In this case, the given UE may be able to transmit uplink traffic channel communications on a particular set of sub-carriers (e.g., those of a particular resource block) used for uplink control communications by the UEs served by the adjacent base station without causing interference in the received control communications at the adjacent base station.

In addition, if the given UE is being detected by its serving base station a high level of quality, this may be a further indication that the UE's uplink transmissions on the particular set of sub-carriers will likely not interfere with those made concurrently on the same particular set of sub-carriers by the UEs served by the adjacent base station. More specifically, the base station of the given UE may measure a SNR for uplink transmissions from the given UE and compare the measurement with a threshold SNR. Then, if in addition to the given UE not detecting the adjacent or neighboring base station above the threshold level, the measured SNR is (at or) above the threshold SNR, the base station can schedule uplink traffic channel communications for the given UE using sub-carriers that the adjacent base station is using for scheduling uplink control channel communication.

That is, the base station serving the given UE can schedule uplink traffic channel communication from the given UE on those particular sub-carriers. At the same time the adjacent base station can use the same particular sub-carriers for scheduling uplink control channel communication.

The base station may use different forms of SNR to make the uplink quality measure. In practice, a typical metric used in LTE and other wireless communication systems is signal to interference plus noise ratio (SINR). As is known, SINR is a metric that incorporates both noise and interference in the quality ratio. SINR can be determined according to known standards and techniques, and provides an indication of link quality observed by a receiving entity (e.g. a base station on an uplink).

Returning to FIG. 6, illustration of concurrent scheduling on a particular set of sub-carriers is now described by way of example. The UE 14-D is depicted a being relatively distant from the overlapping coverage region populated by the other UEs in the figure. Evidently, and by way of example, the base station 14 determines that the UE 14-D does not detect the base station 12 above a threshold level. Such a determination may be made by a message sent by the UE 14-D to the base station 14 that reports detection levels of pilot or other reference signals of neighboring base stations. For example, the message may carry a neighbor detection list that a serving base station (BS 14 in the current example) uses to determine whether and/when to handover a UE to one of the neighboring base stations in the list. Other types of message could be used as well by UEs to report detection levels of one or more base stations.

The UE 14-D is also depicted as being relatively close to its serving base station BS 14. As such, the uplink SINR determined by BS 14 for the UE 14-D may be above the threshold SNR. In practice, the BS 14 may take this determination as an indication that the UE 14-D is nearby. In any case, the determination is an indication that the UE 14-D may be able to transmit uplink traffic communications using particular sub-carriers without excessive power, which might otherwise tend to interfere with uplink control communications on the same particular sub-carriers from the UEs 12-A, 12-B, and 12-C to the base station BS 12.

Having determined that the UE 14-D does not detect the base station 12 above the threshold level, and that the uplink SINR of the UE 14-D is above the threshold SNR, the base station 14 then schedules at least part of an uplink traffic channel communication from the UE 14-D in the first and last resource blocks during the fifth TTI of the frame 604. The transmission by the UE 14-D these schedule resource blocks will overlap in sub-carrier space and time (TTI) with control channel communications transmitted in the same resource blocks of the frame 602 by one or another of the UEs 12-A, 12-B, and 12-C. However, the UE 14-D (i) is sufficiently far from the base station 12, as determined by the UE's weak or absent detection of BS 12, and (ii) has sufficiently high uplink SINR, that no (intolerable) interference will be result. Thus, this technique avoids interference between uplink control channel communications schedule by adjacent base stations, while at the same time enabling concurrent transmission on the same sub-carriers of uplink control channel communications to one base station and uplink traffic channel communications to another, adjacent base station.

In practice, this method can be applied with respect to various pairs of base stations in a representative wireless communication system. Further, the process in such a system could be iterative and could involve negotiation, accounting for the fact that a given base station may be adjacent to more than one other base station.

For instance, consider a scenario where a first base station sits between a second base station and a third base station. Through the present process, the first base station may determine that the second base station will be using particular sub-carriers for scheduling uplink control channel communication (e.g., by receiving a signal from the second base station indicating so, or by directing the second base station accordingly), and the first base station may responsively opt to use different sub-carriers for scheduling uplink control channel communication. Further, the first base station may notify the third base station of the sub-carriers that the first base station is going to use for scheduling uplink control channel communication and may similarly determine which sub-carriers the second base station is going to use for scheduling uplink control channel communication, possibly one of more of the same sub-carriers that the second base station will be using for scheduling uplink control channel communication.

Furthermore, in this arrangement, the first base station may then also avoid scheduling uplink traffic channel communication in both the one or more sets of sub-carriers that the second base station is using for scheduling uplink control channel communication and in one or more sets of sub-carriers that the third base station is using for scheduling uplink control channel communication. Again, the first base station may continue to schedule uplink traffic channel communication in sub-carriers used by either of the second or third base stations for their respective scheduling of uplink control channel communications, so long as the first base station determines that such uplink traffic channel scheduling is applied to UEs that do not detect either of the second or third base stations above a threshold level, and for which uplinks transmissions have respective SINRs above a threshold SINR.

Figure 7:
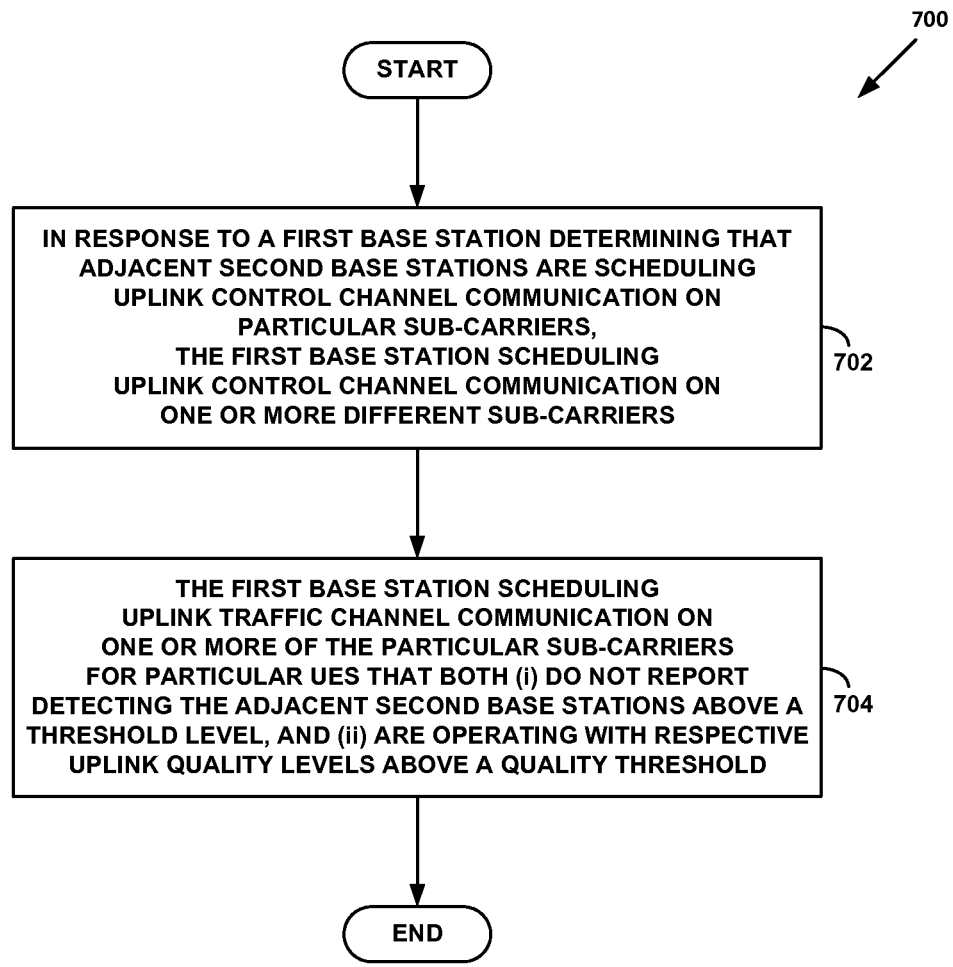
FIG. 7 is a flow chart depicting example operations in accordance with example embodiments.

FIG. 7 is next a flow chart depicting an example method 700 that can be carried out by a base station, such as base stations 12 or 14, in accordance with example embodiments. In particular, the method 700 could be carried out in wireless communication system in which base stations provide respective coverage areas in which to serve user UEs. As described above, base stations in such a system can schedule uplink wireless communications from UEs in their respective coverage areas on selected sub-carriers of a continuum of sub-carriers of a common carrier band during time segments of selected time subframes of a common continuum of time subframes. By way of example, the method 700 can be implemented as machine language instructions that can be stored on non-transient machine-readable media (e.g, solid state memory, magnetic disk, etc), and that when executed by one or more processors of a base station cause the base station to carry out operations, steps, and/or functions of the respective methods.

As shown in FIG. 7, at block 702, in response to a first base station determining that one or more adjacent second base stations are scheduling uplink control channel communication in their respective coverage areas on particular sub-carriers, the first base station schedules uplink control channel communication in its respective coverage area on one or more different sub-carriers, other than the particular sub-carriers. By scheduling in this way, uplink control channel communications from UEs served by the first base station will not interfere with concurrent uplink control channel communication from UEs served by the one or more adjacent second base stations.

At block 704, the first base station schedules uplink traffic channel communication on one or more of the particular sub-carriers for one or more UEs being served by the first base station that (i) do not report detecting the one or more adjacent second base stations above a threshold level, and (ii) are operating with respective uplink quality levels above a quality threshold. Taking the absence of detection above the threshold level by the one or UEs as an indication that they are far from the one or more adjacent second base stations, and taking the uplink quality levels being above a quality threshold as an indication that the one or more UEs can transmit without excessive power, the first base station can schedule uplink traffic channel communications from UEs that will not interfere with interfere with concurrent uplink control channel communication from UEs served by the one or more adjacent second base stations, as discussed above.

In accordance with example embodiments, the first base station can determine that the one or more particular UEs are operating with respective uplink quality levels above the quality threshold by measuring a respective signal-to-noise ratio (SNR) of uplink transmissions from each of the one or more particular UEs, and comparing each respective SNR to a threshold SNR. One or more forms of SNR can be used, including but not limited to SINR.

As a further aspect of the example method, the first base station will abstain from scheduling uplink traffic channel communication on any of the particular sub-carriers for any UEs being served by the first base station that report detecting the one or more adjacent second base stations at or above the threshold level. This will further help ensure that uplink traffic channel communications from any UEs served by the first base station will not interfere with concurrent uplink control channel communication from UEs served by the one or more adjacent second base stations.

In accordance with example embodiments, the first base station may achieve this type of selective scheduling of uplink control channel communication by allocating resource blocks for uplink control channel communication to UEs in its respective coverage area from among resource blocks having no sub-carriers in common with the particular ones of the sub-carriers.

More particularly, the first base station scheduling uplink traffic channel communication on the particular sub-carriers for the one or more UEs being served by the first base station that (i) do not report detecting the one or more adjacent second base stations above a threshold level, and (ii) are operating with respective uplink quality levels above a quality threshold can entail the first base station allocating resource blocks for uplink traffic channel communication to these one or more UEs from among resource blocks having the same sub-carriers as those allocated by the one or more adjacent second base stations for uplink control channel communication.

In accordance with example embodiments, the first base station can determine that the one or more adjacent second base stations are scheduling uplink control channel communication on the particular sub-carriers by exchanging signaling information with the one or more adjacent second base stations. More particularly, the signaling information can include indicia of which of the sub-carriers of the common carrier band the first base station and the one or more adjacent second base stations are using for scheduling uplink control channel communication in their respective coverage areas. Further, exchanging the signaling information with the one or more adjacent second base stations can entail the first base station and the one or more adjacent second base stations negotiating which of the sub-carriers of the common carrier band each base station will use for scheduling uplink control channel communication in their respective coverage areas. In an example embodiment, the exchange of signaling information can be made using an X2 connection between the base stations, or the like.

In accordance with example embodiments, each base station's provided coverage area may define an orthogonal frequency division multiple access air interface, and the time segments are symbol time segments. For example the wireless communication system could be configured according to LTE standards. In such a system, uplink control channel communication can be carried on a physical uplink control channel (PUCCH), and uplink traffic channel communication can be carried on a physical uplink shared channel (PUSCH).

It will be appreciated that the example method 700 could each include alternate and/or additional steps, while still remaining within the scope and spirit of example embodiments herein.

Figure 8:
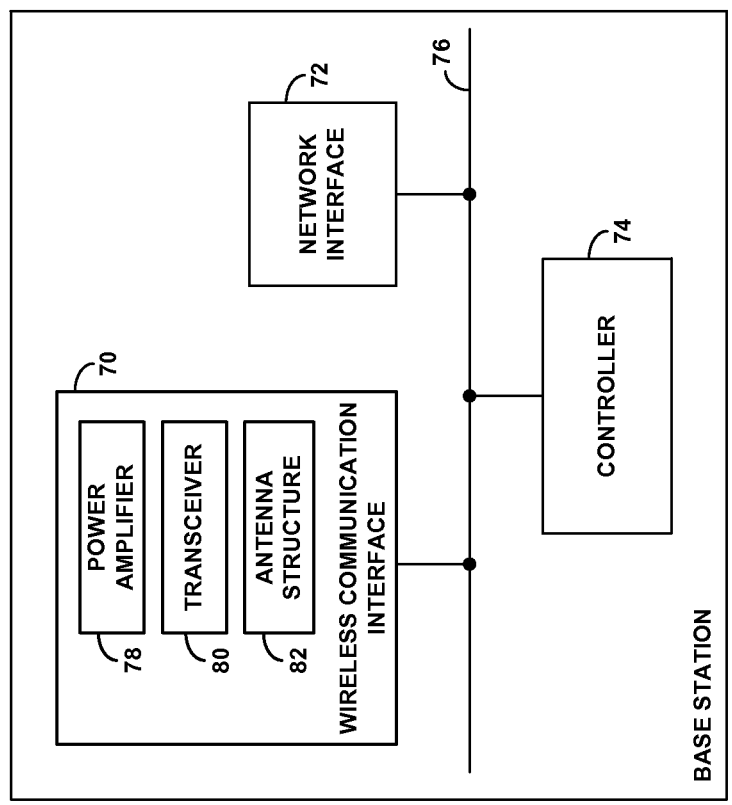
FIG. 8 is a simplified block diagram of an example base station operable in accordance with example embodiments.

FIG. 8 is next a simplified block diagram of an example base station, showing some of the components of such a base station to facilitate operation in accordance with the present disclosure, with the understanding that numerous variations are possible. As shown in FIG. 8, the example base station includes a wireless communication interface 70, a network interface (backhaul interface) 72, and a controller 74, with various ones of these or other components being communicatively linked together by a system bus, network, or other connection mechanism 76 or perhaps integrated together to some extent.

Wireless communication interface 70 may comprise a power amplifier 78, cellular transceiver 80, and antenna structure 82 and may function in combination to provide a coverage area with an air interface as described above. As such, the wireless communication interface 70 may be configured to receive on the air interface symbols transmitted by one or more UEs, and demodulate and decode symbols to recover the data, and to define on the air interface various channels such as a PUCCH and PUSCH as discussed above. Network interface 72 may then comprise a wired and/or wireless network communication interface (such as an Ethernet interface) through which the base station may communicate with other base stations and with various other network entities in line with the discussion above.

Controller 74, which may be integrated with wireless communication interface 70 or one or more other components and may comprise one or more processing units programmed with instructions to carry out various functions, may then control the reception and transmission of data, including uplink and downlink control and user data, on the uplink and downlink air interfaces, respectively. For example, controller 74 may allocate uplink and/or downlink resource blocks to UEs and receive and/or generate corresponding uplink and/or downlink messages, and controller 74 may control reception and/or transmission by wireless communication interface 70 accordingly. Further, controller 74 may implement features of the present method as discussed above, to manage which sub-carriers the base station uses for scheduling uplink control channel communication and which sub-carriers the base station uses for scheduling downlink traffic channel communication. Thus, the base station including such a controller would be configured to carry out such features.

With such an arrangement, in line with the discussion above, the controllers of adjacent first and second base stations may cause their respective base stations to engage in signaling with each other to arrange for (i) the first base station to use a first set of one or more of sub-carriers for scheduling and receiving uplink control channel communication and to avoid using a second set of one or more of sub-carriers for scheduling and receiving uplink traffic channel communication, and (ii) the second base station to use the second set of one or more of sub-carriers for scheduling and receiving uplink control channel communication and to avoid using the first set of one or more of sub-carriers for scheduling and receiving uplink traffic channel communication. The controllers may also determine which served UE do not detect adjacent base stations above a threshold level, and may further then schedule and receive uplink traffic channel communication for those UEs using the set of one or more sub-carriers used by the adjacent base station(s) for its scheduling of uplink control channel communication.

Exemplary embodiments have been described above. Those skilled in the art will understand, however, that changes and modifications may be made to these embodiments without departing from the true scope and spirit of the invention.

We claim:

1. In a wireless communication system in which base stations provide respective coverage areas in which to serve user equipment devices (UEs), wherein the base stations schedule uplink wireless communications from UEs in their respective coverage areas on selected sub-carriers of a continuum of sub-carriers of a common carrier band during time segments of selected time subframes of a common continuum of time subframes, a method comprising:

in response to a first base station determining that one or more adjacent second base stations are scheduling uplink control channel communication from one or more second UEs in their respective coverage areas on particular ones of the sub-carriers of the common carrier band, the first base station concurrently scheduling uplink control channel communication from one or more first UEs in its respective coverage area on one or more different ones of the sub-carriers of the common carrier band, other than the particular ones of the sub-carriers; and the first base station concurrently scheduling uplink traffic channel communication on one or more of the particular ones of the sub-carriers of the common carrier band for one or more particular UEs of the one or more first UEs that both (i) do not report detecting the one or more adjacent second base stations above a threshold level, and (ii) are operating with respective uplink quality levels above a quality threshold.

2. The method of claim 1, further comprising:
the first base station abstaining from concurrently scheduling uplink traffic channel communication on any of the particular ones of the sub-carriers of the common carrier band for any UEs of the one or more first UEs being served by the first base station that report detecting the one or more adjacent second base stations at or above the threshold level.

3. The method of claim 1, wherein each base station is configured to schedule uplink wireless communications from UEs in its respective coverage area by allocating one or more resource blocks, each resource block comprising a contiguous set of the sub-carriers of the common carrier band allocated during the time segments of a given time subframe of the continuum of time subframes, and wherein the first base station concurrently scheduling uplink control channel communication from the one or more first UEs in its respective coverage area on the one or more different ones of the sub-carriers of the common carrier band, other than the particular ones of the sub-carriers, comprises:

the first base station allocating resource blocks for uplink control channel communication to the one or more first UEs in its respective coverage area from among resource blocks having no sub-carriers in common with the particular ones of the sub-carriers.

4. The method of claim 3, wherein the first base station concurrently scheduling uplink traffic channel communication on the one or more of the particular ones of the sub-carriers of the common carrier band for the one or more particular UEs of the one or more first UEs that both (i) do not report detecting the one or more adjacent second base stations above a threshold level, and (ii) are operating with respective uplink quality levels above a quality threshold comprises:

the first base station allocating resource blocks for uplink traffic channel communication to the one or more particular UEs of the one or more first UEs from among resource blocks having the same sub-carriers as those allocated by the one or more adjacent second base stations for uplink control channel communication.

5. The method of claim 1, wherein the first base station determining that the one or more adjacent second base stations are scheduling uplink control channel communication from the one or more second UEs in their respective coverage areas on the particular ones of the sub-carriers of the common carrier band comprises:

the first base station exchanging signaling information with the one or more adjacent second base stations, wherein the signaling information includes indicia of which of the sub-carriers of the common carrier band the first base station and the one or more adjacent second base stations are using for scheduling uplink control channel communication in their respective coverage areas.

6. The method of claim 5, wherein exchanging the signaling information with the one or more adjacent second base stations comprises the first base station and the one or more adjacent second base stations negotiating which of the sub-carriers of the common carrier band each base station will use for scheduling uplink control channel communication in their respective coverage areas.

7. The method of claim 1, wherein each base station's provided coverage area defines an orthogonal frequency division multiple access air interface, wherein the time segments are symbol time segments, and wherein uplink control channel communication comprises physical uplink control channel (PUCCH) communication, and wherein the uplink traffic channel communication comprises physical uplink shared channel (PUSCH) communication.

8. The method of claim 1, further comprising:
the first base station determining that the one or more particular UEs of the one or more first UEs are operating with respective uplink quality levels above the quality threshold by measuring a respective signal-to-noise ratio (SNR) of uplink transmissions from each of the one or more particular UEs of the one or more first UEs, and comparing each respective SNR to a threshold SNR.

9. In a wireless communication system in which base stations provide respective coverage areas in which to serve user equipment devices (UEs), wherein the base stations schedule uplink wireless communications from UEs in their respective coverage areas on selected sub-carriers of a continuum of sub-carriers of a common carrier band during time segments of selected time subframes of a common continuum of time subframes, a first base station comprising:

one or more processors;
memory accessible to the one or more processors; and
machine-readable instructions stored in the memory that, upon execution by the one or more processors, cause the first base station to carry out operations including:

in response to determining that one or more adjacent second base stations are scheduling uplink control channel communication from one or more second UEs in their respective coverage areas on particular ones of the sub-carriers of the common carrier band, concurrently scheduling uplink control channel communication from one or more first UEs in its respective coverage area on one or more different ones of the sub-carriers of the common carrier band, other than the particular ones of the sub-carriers; and concurrently scheduling uplink traffic channel communication on one or more of the particular ones of the sub-carriers of the common carrier band for one or more particular UEs of the one or more first UEs that both (i) do not report detecting the one or more adjacent second base stations above a threshold level, and (ii) are operating with respective uplink quality levels above a quality threshold.

10. The first base station of claim 9, wherein the operations further include:

abstaining from concurrently scheduling uplink traffic channel communication on any of the particular ones of the sub-carriers of the common carrier band for any UEs of the one or more first UEs being served by the first base station that report detecting the one or more adjacent second base stations at or above the threshold level.

11. The first base station of claim 9, wherein each base station is configured to schedule uplink wireless communications from UEs in its respective coverage area by allocating one or more resource blocks, each resource block comprising a contiguous set of the sub-carriers of the common carrier band allocated during the time segments of a given time subframe of the continuum of time subframes, wherein concurrently scheduling uplink control channel communication from the one or more first UEs in its respective coverage area on the one or more different ones of the sub-carriers of the common carrier band, other than the particular ones of the sub-carriers, comprises:

allocating resource blocks for uplink control channel communication to the one or more first UEs in its respective coverage area from among resource blocks having no sub-carriers in common with the particular ones of the sub-carriers, and wherein concurrently scheduling uplink traffic channel communication on the one or more of the particular ones of the sub-carriers of the common carrier band for the one or more particular UEs of the one or more first UEs that both (i) do not report detecting the one or more adjacent second base stations above a threshold level, and (ii) are operating with respective uplink quality levels above a quality threshold comprises:

allocating resource blocks for uplink traffic channel communication to the one or more particular UEs of the one or more first UEs from among resource blocks having the same sub-carriers as those allocated by the one or more adjacent second base stations for uplink control channel communication.

12. The first base station of claim 9, wherein determining that the one or more adjacent second base stations are scheduling uplink control channel communication from the one or more second UEs in their respective coverage areas on the particular ones of the sub-carriers of the common carrier band comprises:

engaging in inter-base-station communication with the one or more adjacent second base stations in order to negotiate which of the sub-carriers of the common carrier band each base station will use for scheduling uplink control channel communication in their respective coverage areas.

13. The first base station of claim 9, wherein each base station's provided coverage area defines an orthogonal frequency division multiple access air interface, wherein the time segments are symbol time segments, and wherein uplink control channel communication comprises physical uplink control channel (PUCCH) communication, and wherein the uplink traffic channel communication comprises physical uplink shared channel (PUSCH) communication.

14. The first base station of claim 9, wherein the operations further include:

determining that the one or more particular UEs of the one or more first UEs are operating with respective uplink quality levels above the quality threshold by measuring a respective signal-to-noise ratio (SNR) of uplink transmissions from each of the one or more particular UEs of the one or more first UEs, and comparing each respective SNR to a threshold SNR.

15. A wireless communication comprising:

a first base station configured to serve one or more first user equipment devices (UEs) in a first coverage area and to schedule uplink wireless communications from the one or more first UEs in the first coverage area on selected sub-carriers of a continuum of sub-carriers of a common carrier band during time segments of selected time subframes of a common continuum of time subframes; and a second base station configured to serve one or more second UEs in a second coverage area and to schedule uplink wireless communications from the one or more second UEs in the second coverage area on selected sub-carriers of the continuum of sub-carriers of the common carrier band during time segments of selected time subframes of the common continuum of time subframes, wherein the first coverage area at least partially overlaps with the second coverage area, and wherein the first base station is further configured to:

make a determination that the second base station is scheduling uplink control channel communication from the one or more second UEs in the second coverage areas on particular ones of the sub-carriers of the common carrier band;

in response to making the determination, concurrently schedule uplink control channel communication from the one or more first UEs in the first coverage area on one or more different ones of the sub-carriers of the common carrier band, other than the particular ones of the sub-carriers; and schedule uplink traffic channel communication on one or more of the particular ones of the sub-carriers of the common carrier band for one or more particular UEs of the one or more first UEs that both (i) do not report detecting the one or more adjacent second base stations above a threshold level, and (ii) are operating with respective uplink quality levels above a quality threshold.

16. The wireless communication system of claim 15, wherein the first base station is further configured to:

abstain from concurrently scheduling uplink traffic channel communication on any of the particular ones of the sub-carriers of the common carrier band for any UEs of the one or more first UEs being served by the first base station that report detecting the second base station at or above the threshold level.

17. The wireless communication system of claim 15, wherein each of the first base station and the second base station is configured to schedule uplink wireless communications from UEs in its respective coverage area by allocating one or more resource blocks, each resource block comprising a contiguous set of the sub-carriers of the common carrier band allocated during the time segments of a respective time subframe of the continuum of time subframes,
and wherein the first base station is further configured to:
concurrently schedule uplink control channel communication from the one or more first UEs in the first coverage area on the one or more different ones of the sub-carriers of the common carrier band, other than the particular ones of the sub-carriers, by: allocating resource blocks for uplink control channel communication to the one or more first UEs in the first coverage area from among resource blocks having no sub-carriers in common with the particular ones of the sub-carriers; and
concurrently schedule uplink traffic channel communication on the one or more of the particular ones of the sub-carriers of the common carrier band for the one or more particular UEs of the one or more first UEs that both (i) do not report detecting the one or more adjacent second base stations above a threshold level, and (ii) are operating with respective uplink quality levels above a quality threshold by: allocating resource blocks for uplink traffic channel communication to the one or more UEs of the one or more first UEs that do not report detecting the second base station above the threshold level from among resource blocks having the same sub-carriers as those allocated by the second base station for uplink control channel communication.

18. The wireless communication system of claim 15, wherein the first base station is configured to make the determination by: engaging in inter-base-station communication with the second base station in order to negotiate which of the sub-carriers of the common carrier band each of the first and second base station will use for scheduling uplink control channel communication in its respective coverage area.

19. The wireless communication system of claim 15, wherein each of the first and second coverage area defines an orthogonal frequency division multiple access air interface, wherein the time segments are symbol time segments,
and wherein uplink control channel communication comprises physical uplink control channel (PUCCH) communication, and wherein the uplink traffic channel communication comprises physical uplink shared channel (PUSCH) communication.

20. The wireless communication system of claim 19, wherein the first base station is further configured to:
determine that the one or more particular UEs of the one or more first UEs are operating with respective uplink quality levels above the quality threshold by measuring a respective signal-to-noise ratio (SNR) of uplink transmissions from each of the one or more particular UEs of the one or more first UEs, and comparing each respective SNR to a threshold SNR.

* * * * *